United States Patent Office 3,135,795
Patented June 2, 1964

3,135,795
PURIFICATION OF PHTHALONITRILES
Edward James Gasson, Epsom Downs, and James Francis McCaughey, South Croydon, England, assignors to The Distillers Company Limited, Edinburgh, Scotland, a British company
No Drawing. Filed Sept. 22, 1959, Ser. No. 841,451
3 Claims. (Cl. 260—465)

The present invention relates to the purification of phthalonitriles and phthalimide obtained by the reaction of xylene with ammonia and oxygen. This application is a continuation-in-part of application Serial Number 653,-048 filed April 16, 1957 (now abandoned).

The vapour phase reaction of xylenes with ammonia and oxygen in the presence of a suitable catalyst such as a vanadium-alumina catalyst, to produce phthalonitriles and phthalimide has already been described. The products are useful intermediates in the synthesis of industrially important organic compounds, for example in the production of phthalic esters. Before being used in such syntheses, however, they must first be freed of small proportions of impurities which occur as by-products in the cyanodemethylation reaction. These impurities include substances such as tolunitriles which impart an odour to the product, isomers of the required dinitrile and also other substances which colour the product.

Known methods for the purification of organic substances have not given satisfactory results. Repeated crystallisation of terephthalonitrile from organic solvents, for instance, gave a product having the theoretical analysis but having a slight colour and a definite odour. The odour persisted in die-(2-hydroxyethyl) terephthalate into which the terephthalonitrile was subsequently converted.

It is an object of the present invention to provide an improved process for the purification of the products obtained by the cyanodemethylation of xylene.

According to the present invention, the process for the purification of phthalonitriles produced by the catalysed vapour phase reaction of xylenes with ammonia and oxygen comprises washing the crude product with water and passing an inert gas or vapour through the crude product at an elevated temperature.

The crude product is conveniently washed by agitation with water. The proportion of water to crude product used in the washing depends upon the degree of purity of the original starting mateiral. Where substantially pure xylene was converted to the dinitrile, two parts by weight of water for each part by weight of crude product is usually sufficient.

Where isophthalonitrile is produced from commercial meta-xylene contaminated with para-xylene, the total weight of water it is preferred to use in water-extracting the crude product should be four times the weight of crude isophthalonitrile to be purified, multiplied by the percent figure of para-xylene present in the xylene starting material.

Where terephthalonitrile is produced from commercial para xylene contaminated with meta-xylene, the total weight of water it is preferred to use in water extracting the crude product should be one and a third times the weight of crude terephthalonitrile to be purified, multiplied by the percent figure of meta-xylene present in the xylene starting material.

This washing procedure removes isomers of the required dinitrile and the coloured material present.

Passing an inert gas through the crude product at an elevated temperature removes the tolunitriles and other odoriferous impurities present. The temperature used is not critical and is conveniently in the range of about 100 to 200° C. The inert gas used is preferably steam.

The two steps in the purification procedure may be carried out in any order. The crude products of the xylene cyanodemethylation reaction are, for example, mixed with at least two parts by weight of water for each part by weight of the product and the mixture is then steam distilled. The steam distillation is preferably arranged so that the weight of water distilled over is at least equal to the weight of reaction product in the residue. The purified reaction product is filtered hot and, if necessary, is washed with more hot water. The temperature of the water during the washing and filtrations should not be less than 90° C. Where the starting materials are relatively pure, extra water washing may be dispensed with, as the agitation of the material with the water during steam distillation, followed by filtration washes out all the coloured impurities. Extra water washing is only required where the starting materials are relatively impure.

Where a large volume of water is necessary in the washing step, it is preferable to divide the total water to be used into two or more portions and wash successively.

The crude reaction product may contain ammonium carbonate or ammonium carbamate. In this case, the mixture of the crude product with water is preferably neutralised or washed with cold water before being heated in order to avoid hydrolysis.

The following example illustrates methods by which the present invention may be carried out. Parts by weight shown therein bear the same relationship to parts by volume as do kilograms to litres. The percentages given, except where otherwise stated, are by weight.

*Example*

Commercial meta-xylene, which consisted of 2.6% ortho-xylene, 95.0% meta-xylene, 2.2% para-xylene and 0.5% ethyl benzene was converted by vapour phase reaction with ammonia and oxygen over a suitable catalyst to a product which contained 95% by weight of isophthalonitrile. The remaining 5% of the product consisted mainly of terephthalonitrile, phthalonitrile, phthalimide, tolunitriles and benzonitrile. 10 pounds of the crude product, 10 gallons of water, and 20 ml. Teepol (an alkyl sulphate anionic detergent) were placed in a 20 gallon vessel fitted at its lower end with a perforated metal plate covered with filter cloth. Below the filter plate was an outlet controlled by a tap. Superheated steam was blown through the suspension of nitriles in water until approximately 2 gallons of water had distilled from the mixture. The tap was then opened allowing the residual hot water to filter through the filter cloth. The filtrate was discarded. The tap was then closed and a further 10 gallons water was added to the vessel and brought to boiling point. The tap was re-opened allowing the water to pass through the filter cloth and the residue was further dried under vacuum. After final drying at 70° C., the filter cake was found to comprise 99 mol percent of isophthalonitrile.

The products of the present invention are particularly valuable intermediates in the production of esters, alkyd and polyester resins and other important chemical compounds. For instance, terephthalonitrile is an intermediate in the production of the fibre-forming linear polyester, polyethylene terephthalate, well-known under the trade names "Terylene" and "Dacron."

We claim:
1. A process for the removal of traces of mono-nitriles, isomers of the required dinitrile and coloured impurities from a compound selected from the group consisting essentially of terephthalonitrile and isophthalonitrile produced by the catalysed vapour phase reaction of xylenes with ammonia and oxygen, which comprises mixing the compound with at least about twice its weight of water, steam distilling the mixture to remove an amount of water at least equal in weight to the compound, whereby traces of mono-nitriles are removed, filtering off the solid compound, and further extracting the residue with hot water having a temperature of not less than 90° C.

2. A process as claimed in claim 1, wherein the compound to be purified is crude isophthalonitrile, and the weight of water used for water extracting the crude isophthalonitrile is about four times the weight of the crude isophthalonitrile multiplied by the percent figure of para-xylene present in the xylene starting material.

3. A process as claimed in claim 1, wherein the compound to be purified is crude terephthalonitrile, and the weight of water used for water extracting the crude terephthalonitrile is about one and a third times the weight of the crude terephthalonitrile multiplied by the percent figure of meta-xylene present in the xylene starting material.

References Cited in the file of this patent
UNITED STATES PATENTS

| | | |
|---|---|---|
| 2,784,212 | Farkas et al. | Mar. 5, 1957 |
| 2,846,462 | Hadley | Aug. 5, 1958 |

OTHER REFERENCES

Weissberger (Editor): "Technique of Organic Chemistry" vol. III, 1950, p. 489.

Weissberger (Editor) "Technique of Organic Chemistry" (Distillation), vol. IV, 1951, pp. 17, 374.

Weissberger (Editor): "Technique of Organic Chemistry" (Separation and Purification), vol. III, Part I, 1956, p. 150.